United States Patent
Yang

(10) Patent No.: US 7,626,892 B2
(45) Date of Patent: Dec. 1, 2009

(54) TIMING DEVICE WITH POWER WINDER

(76) Inventor: Tai-Her Yang, 6F-5 No. 250, Sec. 4, Chung Hsiao E. Rd., Taipei (TW)

( * ) Notice: Subject to any disclaimer, the term of this patent is extended or adjusted under 35 U.S.C. 154(b) by 304 days.

(21) Appl. No.: 11/414,203

(22) Filed: May 1, 2006

(65) Prior Publication Data

US 2007/0252434 A1 Nov. 1, 2007

(51) Int. Cl.
*G04B 23/02* (2006.01)
*G04C 21/00* (2006.01)

(52) U.S. Cl. .............. 368/74; 368/50; 368/51; 368/148

(58) Field of Classification Search .......... 320/104; 368/50, 51, 74, 142, 148, 150
See application file for complete search history.

(56) References Cited

U.S. PATENT DOCUMENTS

| | | | | |
|---|---|---|---|---|
| 3,724,200 A * | 4/1973 | Donner | ................ | 368/149 |
| 4,901,295 A * | 2/1990 | Taguezout et al. | ........... | 368/149 |
| 6,320,822 B1 * | 11/2001 | Okeya et al. | ................ | 368/66 |
| 6,373,789 B2 * | 4/2002 | Koike et al. | ................ | 368/204 |
| 6,422,739 B1 * | 7/2002 | Hara et al. | ................ | 368/209 |
| 2001/0005339 A1 * | 6/2001 | Hara et al. | ................ | 368/208 |
| 2001/0024104 A1 * | 9/2001 | Suzuki | ................ | 320/104 |
| 2001/0046188 A1 * | 11/2001 | Koike et al. | ................ | 368/204 |
| 2002/0136095 A1 * | 9/2002 | Agnoff | ................ | 368/206 |
| 2003/0102841 A1 * | 6/2003 | Patel | ................ | 320/104 |
| 2003/0137275 A1 * | 7/2003 | Suzuki et al. | ................ | 320/104 |
| 2003/0193842 A1 * | 10/2003 | Harrison | ................ | 368/82 |
| 2004/0021441 A1 * | 2/2004 | Komiyama et al. | ......... | 320/104 |
| 2004/0130288 A1 * | 7/2004 | Souther et al. | ............. | 320/104 |
| 2004/0130972 A1 * | 7/2004 | Watanabe et al. | ........... | 368/148 |
| 2004/0208087 A1 * | 10/2004 | Takizawa et al. | ........... | 368/110 |
| 2004/0232881 A1 * | 11/2004 | Amano et al. | ............... | 320/104 |
| 2004/0263115 A1 * | 12/2004 | Bailey, III | ................... | 320/104 |
| 2005/0068003 A1 * | 3/2005 | Gauthier et al. | ............. | 320/104 |
| 2005/0088139 A1 * | 4/2005 | Frank | ......................... | 320/104 |
| 2005/0105401 A1 * | 5/2005 | Akahane et al. | ............. | 368/187 |
| 2006/0028167 A1 * | 2/2006 | Czubay et al. | .............. | 320/104 |
| 2006/0061322 A1 * | 3/2006 | Yamazaki et al. | ........... | 320/104 |
| 2006/0091848 A1 * | 5/2006 | Braun et al. | ................. | 320/104 |
| 2006/0108971 A1 * | 5/2006 | Ono | ........................... | 320/104 |
| 2006/0232238 A1 * | 10/2006 | Horii | ......................... | 320/104 |
| 2008/0067973 A1 * | 3/2008 | Ishikawa et al. | ............ | 320/104 |

\* cited by examiner

*Primary Examiner*—Edward Tso
*Assistant Examiner*—Arun Williams
(74) *Attorney, Agent, or Firm*—Bacon & Thomas, PLLC

(57) ABSTRACT

A timing device utilizes hybrid power to drive a movement of the timing device, the hybrid power supply functioning as an auxiliary unit to deliver power to an electro-magnetically driving unit through an automatic control unit manipulated by a mechanical energy storage status detection unit to produce mechanical energy in time to prevent the movement from stopping; a main spring barrel or a potential difference weight of the kinetic energy storage unit being driven to further drive a wheel chain of the timing device and automatically suspend driving upon the completion of winding the wheel train.

12 Claims, 1 Drawing Sheet

TIMING DEVICE WITH POWER WINDER

BACKGROUND OF THE INVENTION (a) Field of the Invention

The present invention is related to a timing device that utilizes hybrid power, and more particularly to a timing device in which the operation time of the timing device is extended by intermittently connecting a powered wheel train in series with a conventional timer movement.

(b) Description of the Prior Art

A conventional timing device such as a clock or watch working either by automatic or manual winding usually relies upon a main spring barrel or a potential difference weight to store energy and drive a movement that visually and/or audibly displays the time or to provide other mechanically driven functions. However, if the timing device is left unattended for a long period of time in case of an automatic winding, or is not timely rewound in case of manual winding, the timing device will be forced to stop and the time must be reset once again.

SUMMARY OF THE INVENTION

The primary purpose of the present invention is to provide a timing device that utilizes hybrid power to intermittently drive a movement of the timer and that therefore functions as an auxiliary unit for the timing device. To achieve this purpose, electric power from a power supply is timely delivered to an electro-magnetic driving unit through an automatic control unit manipulated by a mechanical energy storage status detection unit to produce mechanical energy. Accordingly, a main spring barrel or a potential difference weight of the kinetics storage unit is driven to further drive a wheel chain of the timing device and automatically suspend driving upon the completion of winding the wheel train.

DETAILED DESCRIPTION OF THE PREFERRED EMBODIMENTS

Figure 1:
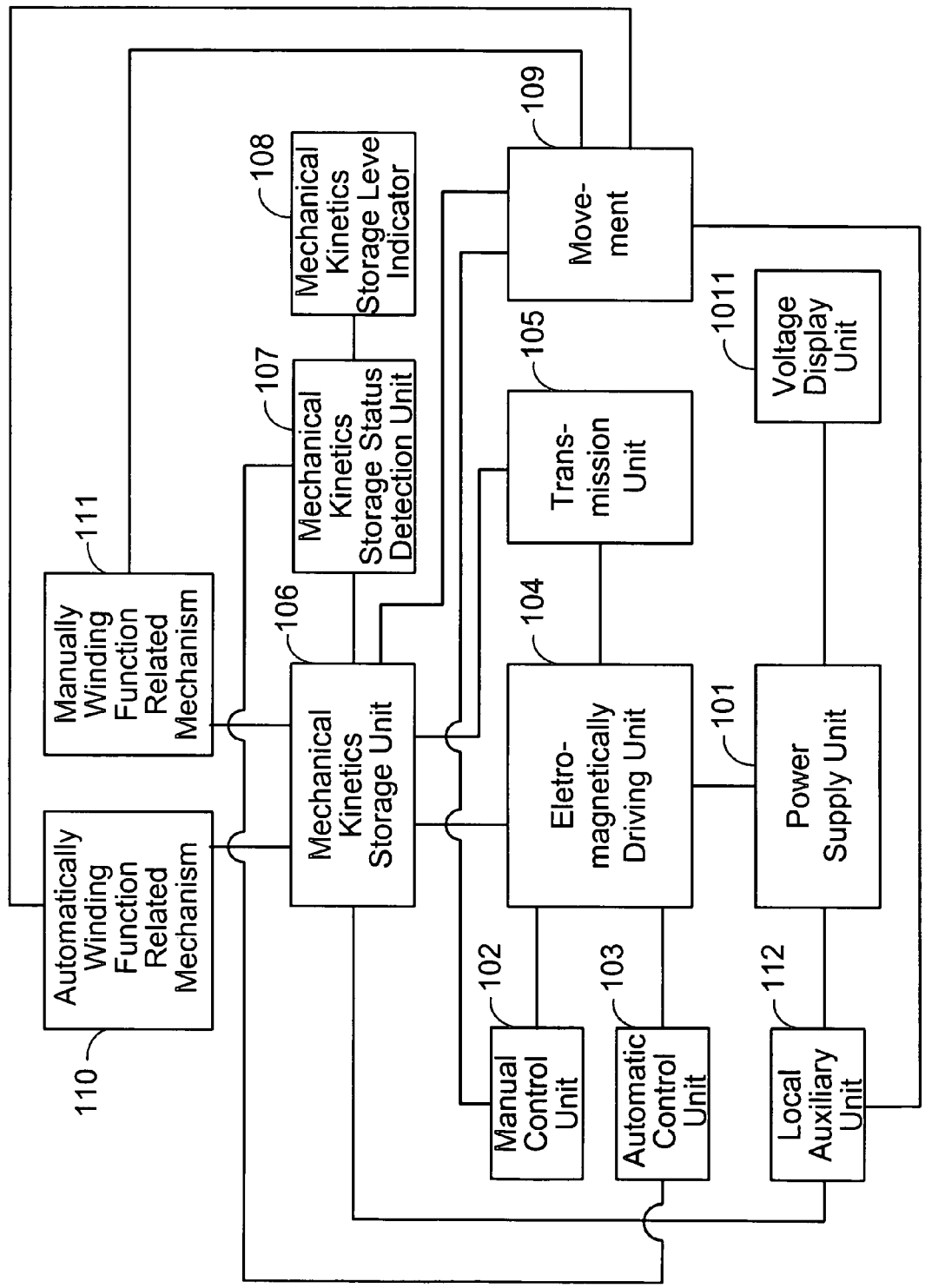
FIG. 1 is a block diagram showing the construction of the present invention.

The present invention relates to a timing device that utilizes hybrid power, in which a power winding for a wheel train operates on the power stored from sources including a battery or capacitor, city power, or any other type of power source, or power converted from oscillation potentials created when the timing device is moved; or power converted from ambient temperature and optical energy incident on the timing device and accumulated by means of an energy storage device, such as a rechargeable battery, capacitor, or ultra capacitor. The power is then utilized in any of the following ways:

(1) A manual control unit is provided to operate a dynamo-electric switch by pressing, pulling, dialing, turning or any other means; a sensor-responsive control is arranged to be activated by means of touch, optics, electromagnetism, or a capacitor detection related electronic switch circuit device; or an audio, optics, or electro-magnetic wave related circuit device is provided for remote control at random of the power winding related mechanism to start or stop power winding; or (2) A mechanical energy storage status detection unit and an automatic control unit to control a winding wheel train related mechanism are provided to deliver in time the power to enable winding of a main spring barrel or a potential difference weight of a mechanical energy storage unit driven by mechanical energy produced by a electric motor or an electro-magnetic drive unit, and to automatically stop driving upon completion of the winding operation;

(3) Either of the two power winding control structures described in the preceding paragraphs (1) and (2) can be provided at the same time with a conventional manual winding structure or a top actuated automatic winding structure; or with both a manual winding structure and a top actuated automatic winding structure at the same time.

FIG. 1 is a functional block diagram illustrating the construction of a preferred embodiment of the present invention. Because the present invention involves dynamo-electric integration, numerous different structures can be employed without changing the system function, which is why a functional block diagram is used to illustrated the invention. In addition to conventional case accessories, the timer movement, and its related accessories, an operational beeper working on mechanical or electric energy, a movable performance device or any other device driven by mechanical power, an electric motor or electro-magnetic force; or a beeping or lighting electronic circuit, or an information, communication, or multi-media A/V and lighting display unit may be provided as desired to accept control by the movement. The present invention includes the following units:

a power supply unit 101, which may be a DC electric storage device comprised of a disposable battery, a rechargeable battery, a capacitor, or an ultra capacitor; a solar cell that converts optical power into electric power; a device that converts thermal energy into electric power; or a dynamo-electric device that converts oscillation potential into electric power adapted to a matching electric storage device; or an AC source; and which may also include an optional voltage display unit 1011 as desired, the power supply unit supplying power to execute power winding, and in addition being capable of supplying power to another power-driven load, e.g., or audio, lighting, or information unit, a communication or multi-media A/V device, a lighting display unit, or any other electronic, power motor, or electro-magnetic force driven performance device, or any other device;

a manual control unit 102 which may include a dynamo-electric or a solid-state electronic switch. the dynamo-electric switch being operated by pressing, pulling, dialing, turning or other means; and the electronic switch including a circuit device responsive to a touch, optical, pulsation, or capacity sensor; or arranged to execute remote control by means of an audio, optical, electromagnetic wave related circuit device, the control unit controlling transport power from the local power supply unit 101 to a electro-magnetically driving unit 104 to be described below, thus to directly drive, or drive through a transmission unit 105 to be described below, a mechanical energy storage unit 106 to be described below to provide power storage for executing or stopping power winding drive function; the manual control unit 102 being necessary when the mechanical storage timing device lacks an automatic control unit 103 to be described below and optional when the mechanical storage timing device allowing power winding includes the automatic control unit 103;

an automatic control unit 103, which may be a dynamo-electric or solid-state electronic device subject to control by a mechanical kinetics storage status detection unit 107 to be described below further controls the operation of the power supply unit 101 on the electro-magnetically driving unit 104 so to drive the mechanical energy storage unit 106 to increase the storage level once the power level drops under a present value and to stop the operation of the electro-magnetic driving unit 104 for stopping the winding, the automatic control unit 103 being provided when an automatic power winding function is to be provided, when the manual control unit 102 is selected for executing manually controlled winding;

an electro-magnetic driving unit 104, which may be an AC or DC, synchronous or asynchronous, brush or brushless rotating motor or a linear motor that converts electric power into rotational or linear motion, converts electric power into step motion, or that converts electric power into reciprocal motion; a solenoid, step motor, or reciprocally driving electro-magnetic actuation device that converts electric power to mechanical motion, or an electro-magnetic device that is further provided with the function of setting up torque for directly driving the main spring barrel or the weight from the mechanical energy storage unit 106;

a transmission unit 105, which may be a gear, connection rod, or one-way transmission, or a clutch, a torque control device, a transmission direction control device, a mechanical, electro-mechanical, or solid-state electronic power switch that allows torque setup; a mechanical or electro-mechanical clutch that allows torque setup; or any other transmission or mechanism that is capable of transmitting mechanical energy, or varying revolution speed ratio or direction so to increase power storage for the mechanical energy storage unit 106 provided by the mechanical potential energy generated by the electro-magnetic driving unit 104 by varying the revolution speed ratio or direction, by executing clutch control of the transmission, by limiting the torque, or by limiting the direction of transmission to increase the mechanical potential energy of the electro-magnetically driving unit 104 as desired, the transmission unit 105 being an optional item since the electro-magnetic driving unit 104 may alternatively directly drive the mechanical energy storage unit 106;

a mechanical kinetic energy storage unit 106 including a main spring barrel or a potential difference weight and its related winding mechanism to release energy to drive a movement 109 to be described below while receiving and converting electric power supplied by the electro-magnetic driving unit 104 to mechanical potential energy by winding the wheel train of the movement 109, the mechanical energy storage unit 106 being optionally further adapted as applicable to include an automatic winding related mechanism, an automatic winding function related mechanism 110, and/or a manual winding function related mechanism 111 to be described below.

a mechanical status storage status detection unit 107 made up of a detection unit that includes a mechanical, electro-mechanical, or solid-state electronic device, or any other device that is capable of directly detecting the storage level of the mechanical energy storage unit 106; a detection unit that measures angular displacement or linear displacement indicative of the storage status of the mechanical energy storage unit 106; or that executes location detection or spring load pressure detection to indirectly detect the storage status of the mechanical energy storage unit 106 before converting the detection results into an analog or digital message of the power level or a potential energy detection message to be fed back to the automatic control unit 103 or displayed by a mechanical energy storage level indicator 108 to be described below, the storage status of the mechanical energy storage unit 106 alternatively indirectly detected by measuring the driving amperage of the electro-magnetically driving unit 104 in the winding drive process in relation to that of the mechanical energy storage unit 106 to enable the detection results to be fed back to the automatic control unit 103 or for display of the mechanical energy storage status, the mechanical energy storage status detection unit 107 being an optional item that may be omitted in case the winding function is subject to the manual control unit 102;

a mechanical energy storage level indicator 108 including an optional dynamo-electric, solid-state electronic, or mechanical analog or digital display unit to receive detection signals sent from the mechanical energy storage status detection unit 107 for display of the storage status of the mechanical energy storage unit 106;

a movement 109 such as the movement of a clock, pocket watch or wrist watch operating on a main spring barrel or a potential difference weight and arranged to tell, display and set the time; and which may be adapted to include optional control mechanisms for audio time telling, a movable performance device or any other device, the movement 109 being provided with an automatic winding function related mechanism 110 and/or a manual winding function related mechanism 111;

a local auxiliary unit 112 including an optional beeping device relying upon mechanical force or electric power as its energy source, or a movable performance device or any other device driven by a mechanical force, electric motor, or electro-magnetic force; or a light, audio and/or video display device controlled by an electronic circuit to emit sound, light, information, communication or multi-media subject to control by the movement, wherein the local auxiliary unit 112 may be a stand-alone unit or one that shares the same construction with the movement 109.

The preferred hybrid power timing device operates as follows:

1. In case of actuation by power winding operation:
   (1) The manual control unit 102 is operated by manipulating a dynamo-electric switch by pressing, pulling, dialing or turning; by operating an electronic switch circuit by a touch, optics, electro-magnetic or capacitance sensor; or by remote control utilizing a voice control, optical control or electro-magnetic wave control circuit device to provide remote control at random for driving the electro-magnetically driving unit 104 before directly driving or indirectly driving through the transmission unit 105 the mechanical kinetics energy unit 106 to increase the stored energy by winding the wheel chain of the timing device; or
   (2) The mechanical energy storage status detection unit 107 comprised of a mechanical, electro-mechanical, or solid-state electronic device allowing location detection to confirm the displacement or pressure value produced by the mechanical energy storage unit 106 when its storage level drops below a preset value, is used to thereby control the automatic control unit 103, and further to control the electric power from the power supply unit 101 for driving the electro-magnetic driving unit 104 to increase energy storage by winding the wheel train; or (3) The operation is done by combination of two means originated from either of those two winding actuation methods described in the preceding subparagraphs (1) or (2).

2. The operation of stopping the power winding is provided as follows:

(1) The electro-magnetic driving unit 104 comprised of a motor that allows torque setup is provided to drive the mechanical energy storage unit 106 to execute a winding drive for increasing energy storage so that once the drive torque required gradually increases when more energy is supplied from the mechanical energy storage unit 106 to the electro-magnetic driving unit 104 to reach a preset torque, the electro-magnetic driving unit 104 stops driving the mechanical kinetics storage unit 106 to avoid excessive winding of the wheel train; or (2) The electro-magnetic driving unit 104 comprised of a motor with its torque and driving current indicating relative variation operates by setting and detecting the drive current when the mechanical kinetics storage unit 106 is driving the wheel train to indirectly detect its torque and stop its drive for preventing excessive winding of the wheel train; or (3) The manual control unit 102 manually controls the dynamo-electric switch, or operates by contacting the contact of an electronic switch device, or by executing remote control by means of a sound, optical or electromagnetic wave control related circuit to stop the electro-magnetically driving unit 104 and prevent excessive winding of the wheel train; or (4) The transmission unit 105 disposed between the electro-magnetically driving unit 104 and the mechanical kinetics storage unit 106 functions as a mechanical or electro-mechanical clutch that allows torque to set up the clutch to automatically disengage or slide when the torque increases up to the preset value upon completing the winding so to prevent excessive winding of the wheel train; or (5) The mechanical energy storage status detection unit 107 comprised of a mechanical or dynamo-electric or solid-state electronic location detection device cuts off the power supply to stop the drive by the electro-magnetically driving unit 104 when the storage unit moves to where the completion of the winding as detected by the location detection device or the pressure value of the storage device reaches a preset value for the completion of the winding to prevent excessive winding of the wheel train; or (6) The electro-magnetically driving unit 104 executes an open loop, semi-open loop, or closed loop scaling and cuts off the power supplied to the electro-magnetically driving unit 104 when the scaling value reaches the preset value.

In practice, the operation of stopping the winding of the wheel train may be executed using one or a plurality of those methods described in sub-paragraphs (1) to (6) above.

Those operations to actuate winding as described in the preceding paragraph 1, and those operations to stop the winding when the winding is completed as described in the preceding paragraph 2 may be combined as desired to execute power winding and stop the winding.

The power winding control construction of the present invention when applied may be further comprised of either or both of the power winding related mechanism and the automatic winding functions and the manual winding structure.

To facilitate manufacturing, application and portability, all the associate units and mechanisms of the timing device of the present invention may be integrated in one piece, or in separate structures that allow incorporation by means of coupling transmission devices.

The present invention incorporates a power winding mechanical storage timing device to upgrade the performance of the mechanical timing device and is applicable to diversified production families of mechanical timing and quartz timingdevices.

I claim:

1. A timing device including a power winder that winds a wheel train of a mechanical timer movement, said mechanical timer movement being supplied with energy by a mechanical storage unit that includes one of a main spring barrel and a potential different weight driven mechanism to be wound by the power winder, said power winder utilizing power stored from a power source selected from a battery or capacitor, city power, power converted from oscillation potentials created when the timing device is moved; and power converted from ambient temperature or optical energy incident on the timing device and accumulated by means of an energy storage device, wherein winding of the wheel train is controlled through a mechanical kinetic energy storage status detection unit and an automatic control unit so as to deliver power to enable driving of an electric winding motor or an electromagnetic winding drive unit for winding said main spring barrel and potential difference weight of said mechanical storage unit and to automatically stop driving of the winding motor and winding drive unit upon the completion of the winding operation, comprising:

a power supply unit including a DC electric storage device comprised of at least one of a disposable battery, a rechargeable battery, a capacitor, an ultra capacitor, a solar cell that converts optical power into electric power; a device that converts thermal energy into electric power; a dynamo-electric device that converts oscillation potential into electric power adapted to a matching electric storage device; and an AC source; the power supply unit supplying power to execute power winding, and in addition being capable of supplying power to another power-driven load;

at least one of a manual control unit and an automatic control unit, the manual control unit including at least one of a dynamo-electric switch and a solid-state electronic switch, the dynamo-electric switch being operated by at least one of pressing, pulling, dialing, and turning; and the electronic switch including a circuit device responsive to a sensor for sensing at least one of a touch, light, pulsation, capacitance; and signal from a remote control to drive through one of a direct drive and a transmission unit, a mechanical energy storage unit providing power storage for executing and stopping a power winding drive function, and the automatic control unit including one of a dynamo-electric or solid-state electronic device subject to control by a mechanical kinetics storage status detection unit to control the operation of the power supply unit on the electro-magnetically driving unit so to drive the mechanical energy storage unit to increase the storage level once the power level drops under a present value and to stop the operation of the electro-magnetic driving unit for stopping the winding;

an electro-magnetic driving unit including at least one of a rotating motor and a linear motor that respectively converts electric power into rotational and linear motion, a step motor that converts electric power into step motion, a reciprocal drive that converts electric power into reciprocal motion, and a solenoid, the driving unit driving a main spring barrel or a weight from the mechanical energy storage unit;

at least one of a direct drive and a drive with a transmission unit, the transmission unit including at least one of a gear, connection rod, one-way transmission, clutch, torque control device, transmission direction control device, a power switch that allows torque setup; a clutch that allows torque setup; and any other transmission or mechanism that is capable of increasing power storage for the mechanical energy storage unit provided by the mechanical potential energy generated by the electro-magnetic driving unit by respectively varying the revolution speed ratio or direction, executing clutch control of the transmission, limiting the torque, and limiting the direction of transmission to increase the mechanical potential energy of the electro-magnetically driving unit;

a mechanical kinetic energy storage unit including one of said main spring barrel and potential difference weight and its related winding mechanism to release energy to drive a movement while receiving and converting electric power supplied by the electro-magnetic driving unit to mechanical potential energy by winding the wheel train of the movement;

for automatic control by said automatic control unit and to facilitate manual control by the manual control unit, one of a mechanical storage status detection unit and a electrical storage status detection unit, the mechanical storage status detection unit made up of a detection unit that includes at least one of a mechanical, electro-mechanical, solid-state electronic device, any other device that is capable of directly detecting the storage level of the mechanical energy storage unit; a detection unit that measures angular displacement or linear displacement indicative of the storage status of the mechanical energy storage unit; and a device that executes location detection or spring load pressure detection to indirectly detect the storage status of the mechanical energy storage unit before converting the detection results into a message to be fed back to the automatic control unit in case of automatic control and supplied to a display unit at least in case of manual control, the electrical storage status detection unit measuring the driving amperage of the electro-magnetically driving unit in the winding drive process in relation to that of the mechanical energy storage unit to enable the detection results to be fed back to the automatic control unit in case of automatic control and supplied to the display unit at least in case of manual control;

a mechanical energy storage level indicator; and a timer movement operating on one of said main spring barrel and potential difference weight and arranged to tell, display and set the time.

2. A timing device as claimed in claim 1, further comprising a local auxiliary unit including one of a beeping device relying upon mechanical force or electric power as its energy source, a movable performance device, any other movable device driven by a mechanical force, electric motor, or electro-magnetic force; and a display device controlled by an electronic circuit to emit at least one of sound, light, information, communication and multi-media subject to control by the movement.

3. A timing device as claimed in claim 1, wherein, in order to actuate a power winding operation, the manual control unit is operated by manipulating a dynamo-electric switch by pressing, pulling, dialing or turning; by operating an electronic switch circuit by a touch, optics, electro-magnetic or capacitance sensor; or by remote control utilizing a voice control, optical control or electro-magnetic wave control circuit device to provide remote control at random for driving the electro-magnetically driving unit before directly driving or indirectly driving through the transmission unit the mechanical kinetics energy unit to increase the stored energy by winding the wheel chain of the timing device.

4. A timing device as claimed in claim 1, wherein, in order to actuate a power winding operation, the mechanical energy storage status detection unit comprised of a mechanical, electro-mechanical, or solid-state electronic device allowing location detection to confirm the displacement or pressure value produced by the mechanical energy storage unit when its storage level drops below a preset value, is used to thereby control the automatic control unit and further to control the electric power from the power supply unit for driving the electro-magnetic driving unit increase energy storage by winding the wheel train.

5. A timing device as claimed in claim 1, wherein, in order to actuate a power winding operation, a combination of the following procedures is carried out:

a. the manual control unit is operated by manipulating a dynamo-electric switch by pressing, pulling, dialing or turning; by operating an electronic switch circuit by a touch, optics, electro-magnetic or capacitance sensor; or by remote control utilizing a voice control, optical control or electro-magnetic wave control circuit device to provide remote control at random for driving the electro-magnetically driving unit before directly driving or indirectly driving through the transmission unit the mechanical kinetics energy unit to increase the stored energy by winding the wheel chain of the timing device; and b. the mechanical energy storage status detection unit comprised of a mechanical, electro-mechanical, or solid-state electronic device allowing location detection to confirm the displacement or pressure value produced by the mechanical energy storage unit when its storage level drops below a preset value, is used to thereby control the automatic control unit and further to control the electric power from the power supply unit for driving the electro-magnetic driving unit 104 to increase energy storage by winding the wheel train.

6. A timing device as claimed in claim 1, wherein to achieve a stopping operation upon completion of winding, the electro-magnetic driving unit comprised of a motor that allows torque setup is provided to drive the mechanical energy storage unit to execute a winding drive for increasing energy storage so that once the drive torque required gradually increases when more energy is supplied from the mechanical energy storage unit to the electro-magnetic driving unit to reach a preset torque, the electro-magnetic driving unit stops driving the mechanical kinetics storage unit to avoid excessive winding of the wheel train.

7. A timing device as claimed in claim 1, wherein to achieve a stopping operation upon completion of winding, the electro-magnetic driving unit comprised of a motor with its torque and driving current indicating relative variation operates by setting and detecting the drive current when the mechanical kinetics storage unit is driving the wheel train to indirectly detect its torque and stop its drive for preventing excessive winding of the wheel train.

8. A timing device as claimed in claim 1, wherein to achieve a stopping operation upon completion of winding, the manual control unit manually controls the dynamo-electric switch, or operates by contacting the contact of an electronic switch device, or by executing remote control by means of a sound, optical or electro-magnetic wave control related circuit to stop the electro-magnetically driving unit and prevent excessive winding of the wheel train.

9. A timing device as claimed in claim 1, wherein to achieve a stopping operation upon completion of winding, said transmission unit functions as a clutch that allows torque to set up the clutch to automatically disengage or slide when the torque increases up to the preset value upon completing the winding so to prevent excessive winding of the wheel train.

10. A timing device as claimed in claim 1, wherein to achieve a stopping operation upon completion of winding, the mechanical energy storage status detection unit comprised of a mechanical or dynamo-electric or solid-state electronic location detection device cuts off the power supply to stop the drive by the electro-magnetically driving unit when the storage unit moves to where the completion of the winding as detected by the location detection device or the pressure value of the storage device reaches a preset value for the completion of the winding to prevent excessive winding of the wheel train.

11. A timing device as claimed in claim 1, wherein to achieve a stopping operation upon completion of winding, the electro-magnetically driving unit executes an open loop, semi-open loop, or closed loop scaling and cuts off the power supplied to the electro-magnetically driving unit 104 when the scaling value reaches the preset value.

12. A timing device as claimed in claim 1, wherein the electric energy storage unit is arranged to supply power to another power-driven load.

* * * * *

UNITED STATES PATENT AND TRADEMARK OFFICE
CERTIFICATE OF CORRECTION

PATENT NO. : 7,626,892 B2 Page 1 of 1
APPLICATION NO. : 11/414203
DATED : December 1, 2009
INVENTOR(S) : Tai-Her Yang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Twenty-first Day of December, 2010

David J. Kappos
*Director of the United States Patent and Trademark Office*